United States Patent
Delamater

[11] 3,845,902
[45] Nov. 5, 1974

[54] SPRINKLER FEEDER FOR LAWN FOOD

[76] Inventor: William B. Delamater, 9114 Valley View, Whittier, Calif. 90603

[22] Filed: Feb. 11, 1972

[21] Appl. No.: 215,979

[52] U.S. Cl............... 239/314, 47/1, 137/268, 239/521, 239/524, 239/543
[51] Int. Cl............................................. A01c 15/00
[58] Field of Search............ 137/268; 239/310, 313, 239/314, 315, 316, 418, 504, 543, 545, 505, 521, 524

[56] References Cited
UNITED STATES PATENTS

| 2,787,499 | 4/1957 | Rolston | 239/315 X |
| 2,829,874 | 4/1958 | Freeman | 239/514 X |
| 3,157,320 | 11/1964 | Sherriffe | 239/314 X |
| 3,191,868 | 6/1965 | Brown et al. | 239/315 |

FOREIGN PATENTS OR APPLICATIONS

| 207,770 | 2/1960 | Austria | 239/314 |

Primary Examiner—Lloyd L. King
Assistant Examiner—Andres Kashnikow
Attorney, Agent, or Firm—I. Morley Drucker

[57] ABSTRACT

A sprinkler feeder having a bowl body for holding agricultural fertilizing chemicals in solid granule and pellet form, a lid for the body for maintaining the fertilizer therein, the lid provided with perforations whereby water directed into the lid may flow through said perforations for contact with the fertilizing chemical to dissolve the same. The body is provided with a perforated base and means for supporting same above a spray head or for attachment to a water nozzle in such a manner that water emitted from the nozzle or by the spray head has a portion thereof directed into the cup. As the fertilizer dissolves it flows through the perforations in the base of the body. A central overflow or discharge tube extends from the interior of the cup through the body for discharge into the water spray from head or nozzle thus distributing fertilizer over an area covered by the water spray.

5 Claims, 5 Drawing Figures

PATENTED NOV 5 1974　　3,845,902
Fig. 1.
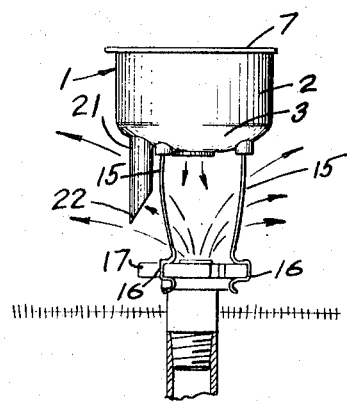
Fig. 2.
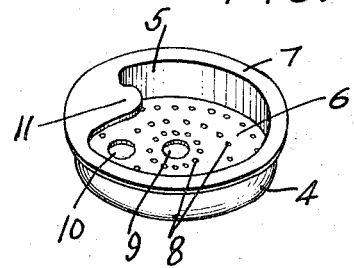
Fig. 3.
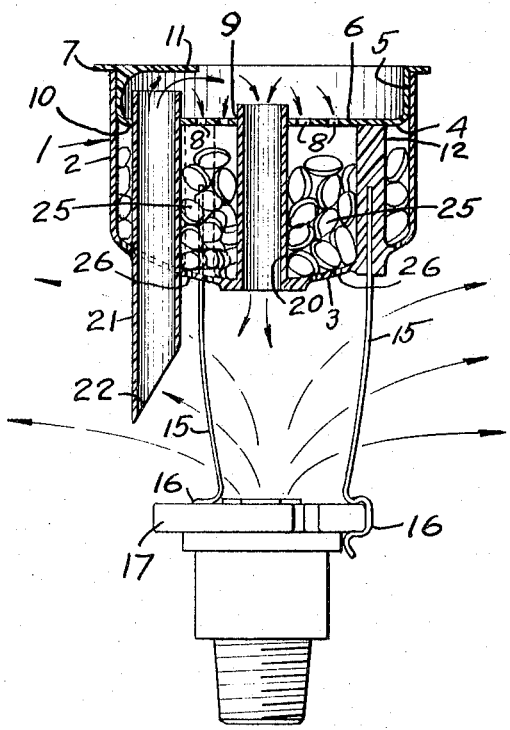
Fig. 4.
Fig. 5.

3,845,902

SPRINKLER FEEDER FOR LAWN FOOD

BACKGROUND OF THE INVENTION

The invention relates to automatic means for discharging chemical fertilizer of any form into a water spray during the spraying of any area requiring water such as lawns, flowers, vegetables and the like.

SUMMARY OF THE INVENTION

The invention provides a simple inexpensive device for the distribution of fertilizer, which term includes insecticides, into a stream of water and utilizes a bowl-like body into which fertilizer of different forms is placed, the body being capped by a lid which has a circular side wall and a perforated base wall and the bowl-like body is provided with a central tube which extends from the base of the bowl to the perforated base of the lid. A second tube extends through the base of the bowl-like body and to the base wall of the lid, the lower end of said tube has a slanting or angular cut and the upper end of the tube is spaced below a baffle which extends over the outlet of said tube. The body is provided with equidistantly spaced apart bosses which extend from the base of the bowl-like body upwardly to the base of the lid. Wire supports are secured to the bosses and provided with clip portions for securing the wire supports to a spray head or sprinkler of some form and in such position that the device is elevated a short distance above the sprinkler head or to one side of the nozzle. Water from the sprinkler head or nozzle strikes a water feed tube and the water is directed upwardly through said tube into the lid impinging against the baffle to direct the water horizontally within the lid. When fertilizer of some form is within the body, water will pass through the perforations in the base of the lid for contact with the fertilizer. The base of the bowl-like body is provided with perforations whereby dissolved fertilizer may pass therethrough for contact with the water spray for directing over a given area. An overflow extends between the lid and the base of the body and will direct any excess dissolved fertilizer downwardly to the spray from the nozzle for mixing with the water spray. The device as an entirety may be formed from plastic such as styrene, ABS, acetal resins, or formed from coated paper such as universally used in milk cartons, cottage cheese containers and the like. The device may be of permanent form for repeated use or in some instances the device may be formed from a soluble material.

An object of the invention is to provide a simple inexpensive sprinkler feeder for fertilizer of different forms which may be readily attached to a sprinkler head or to a sprinkler nozzle to supply the water sprayed from said nozzle or sprinkler head with fertilizer.

BRIEF DESCRIPTION OF THE DRAWING

FIG. 1 is a fragmentary, partially sectional view of the sprinkler feeder in side elevation secured to a spray nozzle;

FIG. 2 is a fragmentary top plan view, on an enlarged scale of the sprinkler feeder;

FIG. 3 is a sectional view on the line 3—3 of FIG. 2;

FIG. 4 is a perspective view of the top of the lid; and,

FIG. 5 is a fragmentary, partially sectional perspective view, looking from the top of the body.

DESCRIPTION OF THE PREFERRED EMBODIMENT

The sprinkler feeder for fertilizer includes a bowl-like body 1 having a circular side wall 2 and a concave-convex base 3. A lid 4 has a circular side wall 5 which fits within a portion of the circular side wall of the body. The lid is provided with a flat base 6 joining the curved side wall 5 and the upper edge of the side wall 5 is provided with a rim flange 7 which overlies the top edge of the side wall 2 of the body. The base 6 is provided with a series of transverse perforations 8. The lid base is centrally transversely bored at 9 and provided with an eccentric transverse bore at 10. Overlying the eccentric bore 10 is a baffle plate 11 of substantially sector form and which baffle plate lies in the plane of the rim flange 7.

The body is provided, in the present instance, with three equidistantly spaced apart bosses 12. The bosses stand vertically upright within the body and are joined with the base 3. The upper end of each boss terminates adjacent the base 6 of the lid when the lid is positioned within the body as shown in FIG. 3. Each boss is adapted to receive an end of a wire or plastic support. In the present instance there are three wire supports of identical form, designated as 15, and each wire support is provided with a U-shaped portion 16 which functions as a clip for engagement with a sprinkler head 17 as shown in FIG. 3. An open ended overflow tube 20 is secured to the base 3 of the body and extends through the central opening 9 of the lid. A water feed tube 21 is open ended and extends through and below the base 3 of the body, the lower end of said tube provided with a slant or angular cut 22 and the upper end thereof extends through the eccentric bore 10 of the lid base, the outlet end being positioned below the baffle plate 11.

The operation, uses and advantages of the device are as follows.

When the wire clips 16 are engaging the flange of the sprinkler head 17, the device is held quite firmly elevated above the water spray from said sprinkler. Fertilizer of some form is received within the confines of the body such as fertilizer pellets 25 shown in FIG. 3. The base 3 is provided with perforations as shown at 26. After the bowl is filled with pellets 25, the lid is positioned so that the tubes 20 and 21 pass through the holes 9 and 10. When the water is passed through the sprinkler head, a portion of the water spray will enter the angular end 22 of tube 21 and be directed upwardly through said tube where it strikes the baffle plate 11 which deflects the water horizontally across the base 6 of the lid. The water then flows through the perforations 8 and is received in the bowl to dissolve the pellets 26. As the pellets dissolve, the excess dissolved fertilizer moves upwardly, and passes through the perforations 8 and overflows the upper end of the discharge tube 20 then the fertilizer and water moves downwardly for engagement with the spray from the sprinkler where the fertilizer mixes with the sprinkler spray for fertilizing and sprinkling a given area. The dissolved fertilizer also passes through the base perforations 26. After use of the sprinkler feeder it may be removed from the sprinkler head by separating the wire clips therefrom, the lid removed from the body and after a clean-out, if necessary, the body may receive further fertilizer pellets for further fertilizing a given area. It is felt unnecessary to detail use of the device with a spray nozzle as the wires 15 may either be bent for engagement with the nozzle to position the water feed tube in the flow path of the spray from said nozzle, or the wire supports may be bent to engage a Rainbird type of spray nozzle. It is obvious that the wire supports may be bent to fit standard and pop-up sprinkler heads of various sizes and particularly where the water spray from a hose nozzle or from a sprinkler head is basically horizontal as indicated by the arrows in FIGS. 1 and 3.

I claim:

1. A sprinkler feeder for agricultural fertilizing chemicals for use with sprinkler heads and nozzles for spraying water over a given area: comprising, a body for holding fertilizing chemicals, a lid for said body for maintaining the fertilizing chemicals within the body, means for supporting the body above a sprinkler head, means for directing a portion of the spray from said sprinkler head to said lid for passage through the lid into the body to dissolve the fertilizer, and means extending between the lid and the body for directing fertilizer received within the lid into the path of spray from said sprinkler head.

2. A sprinkler feeder for fertilizing chemicals comprising a body and a lid for the body, an open ended tube extending centrally through the body and the lid, and an open ended tube extending eccentrically through the body and the lid, means for supporting the body and the lid above the spray from a sprinkler head, the eccentric positioned tube having an angular cut end directed towards the spray from the sprinkler head for moving the spray and directing the same upwardly into the lid and a baffle plate positioned above the outlet end of said eccentrically positioned tube for directing spray from said sprinkler substantially horizontally of the lid.

3. The device as set forth in claim 2, said lid provided with perforations through which spray water received in the lid is directed into the body.

4. The device as set forth in claim 1, and a baffle plate for directing spray water received within the lid substantially horizontally of said lid.

5. A sprinkler feeder for agricultural fertilizing chemicals for use with sprinkler heads and nozzles for spraying water over a given area: comprising, a body for holding chemical fertilizer, said body having a circular side wall and a substantially concave base wall, the base wall provided with transverse perforations and a lid having a curved side wall fitting within the curved side wall of the body, and a substantially flat perforated base wall, said body adapted to receive the chemical fertilizer, means for securing the body to a sprinkler head, means for directing a portion of the spray of water from said sprinkler head into the lid for passage through the perforations of the base of said lid into said body to dissolve the chemical fertilizer for passage through the perforations in the base of said body into engagement with the spray from the sprinkler head.

* * * * *